Aug. 21, 1923.
H. E. VOBACH
SPRING WHEEL
Filed Nov. 19, 1919
1,465,747
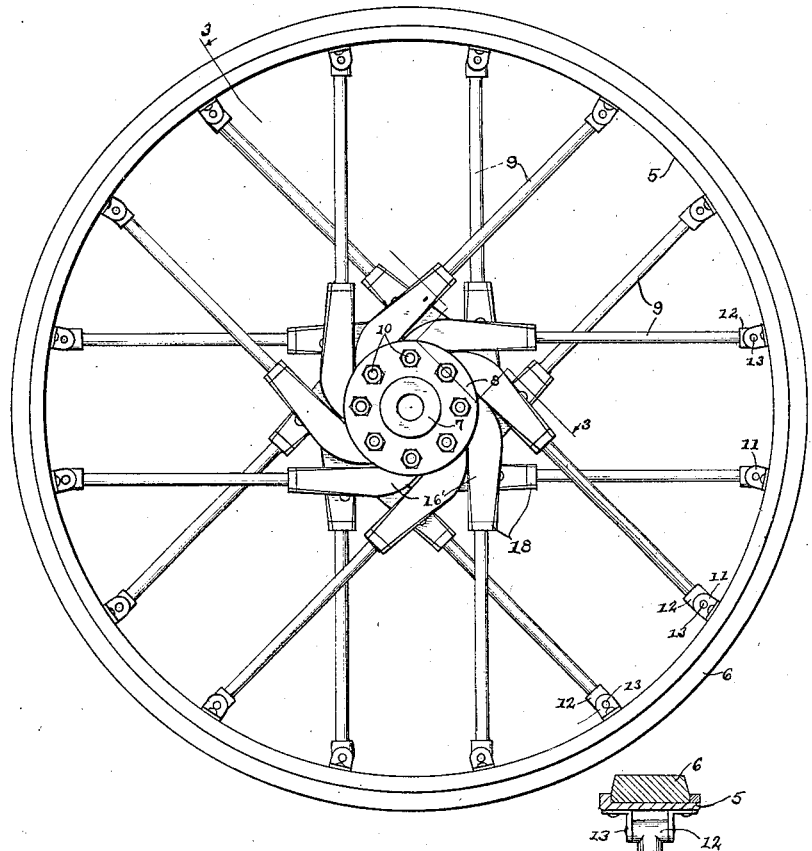
Fig.1.
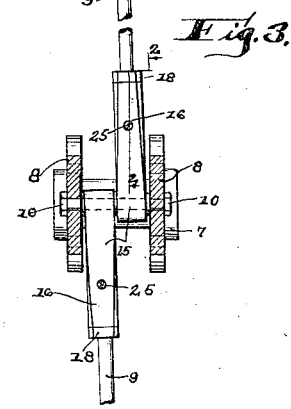
Fig.3.
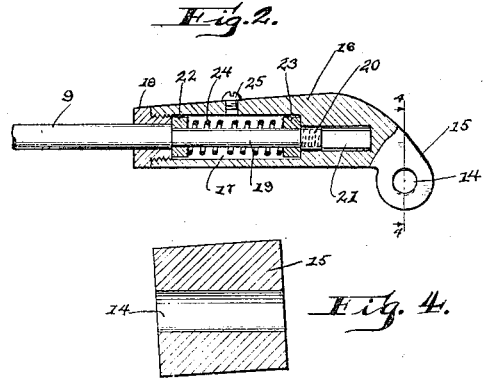
Fig.2.
Fig.4.
Inventor
Herman E. Vobach
By Morsell + Keeney
Attorneys.

Patented Aug. 21, 1923.

1,465,747

UNITED STATES PATENT OFFICE.

HERMAN E. VOBACH, OF MADISON, WISCONSIN.

SPRING WHEEL.

Application filed November 19, 1919. Serial No. 339,006.

*To all whom it may concern:*

Be it known that I, HERMAN E. VOBACH, a citizen of the United States, and resident of Madison, in the county of Dane and State of Wisconsin, have invented new and useful Improvements in Spring Wheels, of which the following is a description, reference being had to the accompanying drawings, which are a part of this specification.

My invention relates to certain new and useful improvements in vehicle wheels and has for its primary object to provide a vehicle wheel so constructed as to absorb any shocks imparted thereto as the same travels the ground's surface.

Another object of this invention is to provide a vehicle wheel in which the spokes have their inner ends tangentially pivotally connected with the hub member and their outer ends pivotally connected with the rim member and so constructed as to be yieldably extensible or contractible under stress whereby shocks imparted to the wheel will be absorbed by all of the spoke members.

A further object of my invention is to provide a vehicle wheel embodying two sets of yieldably contractible and extensible spokes having their inner ends tangentially pivoted to the hub member and their outer ends pivoted to the rim member, one set extending in one direction, and the other set in another direction whereby the same will yieldingly counteract the action of the spokes of the different sets.

A further object of the present invention is to provide a vehicle wheel of the class described which will efficiently absorb shocks imparted thereto and which will be compact in structure and neat in appearance.

With the above and other objects in view which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Fig. 1 is a side plan view of a complete wheel embodying the features of my invention.

Fig. 2 is a sectional view through one of the spoke securing members, said view being taken on the line 2—2 of Fig. 3.

Fig. 3 is a view, part in section and part in elevation, of two adjacent spokes of the sets, said view being taken on the plane indicated by line 3—3 of Fig. 1, and Fig. 4 is a detail sectional view taken on the line 4—4 of Fig. 2.

Referring now more particularly to the accompanying drawing, the numeral 5 indicates a vehicle rim having a tire 6 mounted thereon; 7 a hub member having a pair of spaced plates 8 secured thereto; and 9 a plurality of spokes, of novel construction, as will be hereinafter described having their inner ends tangentially pivotally connected to the hub plates 8 by means of pivot bolts 10 and their outer ends pivotally connected to the rim 5 in spaced relation by means of spaced apart ears or lugs 11 between which T-heads 12 carried by the outer ends of the spokes 9 are secured by pivots 13.

As best shown in Fig. 3 the spokes are arranged in two sets, one set extending tangentially from one plate 8 in one direction and the other set extending in an opposite direction from the other plate 8, each pivot bolt 10 providing the pivot for the adjacent spokes of the two sets as best shown in Fig. 3. In order that the outer ends of the spokes of both sets may be disposed centrally with respect to the sides of the rim 5, the transverse bore 14 of the inner end 15 of a securing member 16 forming the inner end of each spoke 9 is slightly inclined as best shown in Figs. 2 and 4, the inclination of adjacent securing members 16 of the sets being in opposite directions as will be obvious from Fig. 3.

Each securing member has its outer end centrally bored as at 17 in which bore the inner end of the spoke rod is slidably mounted, the spoke rod being slidably projected therein through a threaded cap 18 closing the bore 17. The portion of the spoke rod disposed within the bore 17 is reduced as at 19 and has secured to the extreme inner end thereof a knob or end 20 which is slidably disposed within a counter bore or recess 21 communicating with the bore 17, two collars 22 and 23 being slidably mounted upon the reduced portion 19 as best shown in Fig. 2. The collar 22 is normally urged to engage against the cap 18 and the collar 23 is normally urged to engage against the shoulder formed at the junction of the bore 17 and recess 21 by means of an extensile spring 24 disposed about the reduced portion 19 and having its ends engaged against the collar members.

By this structure it will be at once apparent that the springs 24 will normally urge the parts to the position depicted in Fig. 2 and that, when an inward pressure is exerted upon the spoke rod, collar 22 will be moved inwardly by means of the shoulder formed between the spoke rod and reduced portion 19 and the spring 24 compressed between it and the collar 23 which is held stationary by the shoulder between the bore 17 and recess 21. When the spoke rod is moved outwardly the operation is exactly the reverse, as will be readily understood. In order that the parts within the securing member 16 may be thoroughly lubricated I provide an oil opening communicating with the bore 17 and normally closed by a cap 25.

By the structure hereinbefore described, when a load is placed upon the hub 7 all of the spokes will be moved from their normal position, some being extended and others contracted and the adjacent spokes of the sets operating in opposite directions to counteract the movement thereof and efficiently absorb any shocks imparted thereto.

What I claim for my invention is:

1. A vehicle wheel comprising a rim member, a hub member, socket members tangentially disposed with respect to said hub member and each having an inbent end, means pivotally securing said inbent ends to the hub member, spokes having their inner ends slidably mounted in said socket members, means for resiliently resisting longitudinal movement of said spokes, and means pivotally connecting the outer ends of said spokes with the rim member.

2. A vehicle wheel comprising a rim member; a hub member; pivot means carried by said hub member; pairs of socket members positioned side by side having their inner ends closed and curved laterally and provided with aligned transverse bores, the walls of which engage said pivot means, the axes of said bores making an acute angle with the axes of the sockets, whereby said sockets may be inclined out of the vertical plane and be in alignment with the center of said rim member, the socket members of each pair extending in opposite directions; spoke members having their inner ends yieldably secured in said socket members; and means securing the outer end of said spoke members to the center of said rim member in spaced relation.

3. A vehicle wheel comprising a rim member, a hub member, two sets of spoke receiving members, arranged in pairs, the members of each pair extending tangentially from the hub member in opposite directions and having their inner ends tangentially pivoted side by side to the hub member by a common pivot member, and their outer portions bored, a spoke rod having its inner end slidably mounted within the bore of each receiving member, two collars slidably mounted on the portion of the spoke rod disposed within the receiving bore, shoulders on said spoke rod for limiting the movement of the innermost collar toward the inner end of the spoke rod, and the movement of the outermost collar toward the outer end of the spoke rod, an extensible spring coiled around each spoke rod between the collars, and means in the bores of the receiving members for engaging the outer faces of the collars, whereby movement of the spoke rods, with respect to the securing members, will be yieldingly resisted by said springs.

In testimony whereof, I affix my signature.

HERMAN E. VOBACH.